(12) United States Patent
Evers et al.

(10) Patent No.: US 8,541,911 B2
(45) Date of Patent: Sep. 24, 2013

(54) MAGNETIC ACTOR AND A METHOD FOR ITS INSTALLATION

(75) Inventors: Arndt Evers, Oestrich-Winkel (DE); Ralf Tillmann, Mannheim (DE)

(73) Assignee: Integrated Dynamics Engineering GmbH (DE)

( * ) Notice: Subject to any disclaimer, the term of this patent is extended or adjusted under 35 U.S.C. 154(b) by 363 days.

(21) Appl. No.: 12/959,457

(22) Filed: Dec. 3, 2010

(65) Prior Publication Data
US 2011/0169346 A1 Jul. 14, 2011

(30) Foreign Application Priority Data
Jan. 13, 2010 (DE) .......................... 10 2010 004 642

(51) Int. Cl.
*H02K 41/02* (2006.01)
*H02K 41/03* (2006.01)

(52) U.S. Cl.
USPC ..................................... 310/12.04; 310/12.16

(58) Field of Classification Search
USPC ........................................... 310/12.04, 12.16
See application file for complete search history.

(56) References Cited

U.S. PATENT DOCUMENTS

| 4,864,170 | A | * | 9/1989 | Eguchi | 310/12.04 |
| 5,057,723 | A | * | 10/1991 | Umehara et al. | 310/12.04 |
| 5,675,195 | A | * | 10/1997 | Takei | 310/12.21 |
| 5,770,899 | A | * | 6/1998 | Hayashi | 310/12.06 |
| 6,084,319 | A | * | 7/2000 | Kamata et al. | 310/12.29 |
| 6,107,703 | A | * | 8/2000 | Korenaga | 310/12.06 |
| 6,806,594 | B2 | * | 10/2004 | Koyanagawa et al. | 310/12.04 |
| 6,836,031 | B2 | * | 12/2004 | Emoto et al. | 310/12.21 |
| 6,864,602 | B2 | * | 3/2005 | Korenaga | 310/12.24 |
| 6,972,499 | B2 | * | 12/2005 | Emoto | 310/12.25 |
| 7,178,225 | B2 | * | 2/2007 | Narikiyo et al. | 29/739 |
| 7,218,020 | B2 | * | 5/2007 | Emoto | 310/12.04 |
| 7,462,958 | B2 | * | 12/2008 | Hazelton | 310/12.06 |
| 7,663,270 | B2 | * | 2/2010 | Sadakane et al. | 310/12.29 |
| 2003/0127317 | A1 | | 7/2003 | Cope et al. | |
| 2003/0127916 | A1 | | 7/2003 | Godkin | |
| 2005/0212362 | A1 | * | 9/2005 | Emoto | 310/12 |

FOREIGN PATENT DOCUMENTS

| CN | 1 170 212 A | 1/1998 |
| DE | 698 16 941 T2 | 6/2004 |
| DE | 103 30 418 A1 | 2/2005 |
| DE | 601 18 685 T2 | 11/2006 |
| DE | 10 2008 007 712 A1 | 8/2009 |
| EP | 1 286 222 A1 | 2/2003 |
| EP | 1 857 878 A1 | 11/2007 |
| JP | 10041098 A | 2/1998 |
| JP | 2003032996 A | 1/2003 |
| JP | 2005-515741 A | 5/2006 |
| JP | 2009284740 A | 12/2009 |

OTHER PUBLICATIONS

Translation of foreign document JP 2009284740.*
Masanori Sakurada, "Related JP Patent Application No. JP 2011-005043 Office Action", Dec. 21, 2012, Publisher: JPO, Published in: JP.

(Continued)

*Primary Examiner* — Tran Nguyen
*Assistant Examiner* — Alex W Mok
(74) *Attorney, Agent, or Firm* — Kaplan Breyer Schwarz & Ottesen, LLP

(57) ABSTRACT

The invention relates to a magnetic actor in which the permanent magnets are arranged in a Halbach configuration and inserted into a slide-in frame.

15 Claims, 6 Drawing Sheets

(56) References Cited

OTHER PUBLICATIONS

German Patent Office, "German Office Action for German Application No. 10 2010 004 642.6-24", Dec. 3, 2010, Publisher: German Patent Office, Published in: DE.

"European Office Action for European International Application No. EP 11 00 0215", Jun. 7, 2011, Publisher: European Patent Office, Published in: EP.

\* cited by examiner

MAGNETIC ACTOR AND A METHOD FOR ITS INSTALLATION

CROSS-REFERENCE TO RELATED APPLICATIONS

German patent application DE 10 2010 004 642.6, filed Jan. 13, 2010, is incorporated herein by reference.

FIELD OF THE INVENTION

The invention relates to a magnetic actor and to a method for its installation. In particular, the invention relates to a magnetic actor that is configured as a force actor for the active vibration isolation in the context of a vibration isolation system in the semiconductor technology.

BACKGROUND OF THE INVENTION

Magnetic actors are known in the art. They are a type of linear motor comprising a coil that is disposed between permanent magnets. When using such a magnetic actor for active vibration isolation, a part of the magnetic actor, for example the coil on the load that is to be isolated, and the other part, for example the permanent magnets, are fastened to the base. By triggering the coil it is possible to generate a force at least in one direction via the magnetic actor. This way, the magnetic actor can be used, for example, parallel relative to a fluid bearing for the active vibration isolation. Magnetic actors of this kind are used, in particular, to reduce vibrations that are generated by the load that is to be isolated, such as, for example, a wafer inspection machine with moving parts.

Known from the practice are magnetic actors that have the permanent magnets glued to the fastening plate. Disadvantageously, however, it is difficult to position the magnets during the gluing process, in particular due to the magnetic forces after the first magnet has been glued in position. Therefore, normally only an individual magnet is glued in and it is necessary to wait with the gluing-in of the next magnet until the glue of the previously glued magnet has cured.

Furthermore, magnetic actors known from the practice are normally only envisioned for a maximum force of 70 N. If, depending on the application, a larger force is required, it is necessary to operate several actors in a parallel manner.

SUMMARY OF THE INVENTION

The object of the invention is therefore to reduce the described disadvantages of the state of the art.

In particular, it is the object of the invention to provide a magnetic actor that is easier to install and able to generate strong forces.

The invention relates to a magnetic actor that comprises two lateral parts with permanent magnets arranged opposite to each other. In particular, the permanent magnets are arranged in a Halbach configuration. The permanent magnets are correspondingly arranged in a respectively rotating magnetic orientation relative to each other. Using an arrangement, which is also known as a Halbach array, it is possible to increase the magnetic flow on one side and to weaken the magnetic flow on the other side.

A coil is arranged between the lateral parts, which are opposite to the side where the flow increase occurs, and movable relative to the lateral parts. When the coil is triggered, a force is generated between the lateral parts and the coil, normally perpendicular relative to the axis of the coil. Usually the coil is connected with a control device that is part of active vibration isolation and through which power is applied to the coil. This way, it is possible to generate a defined force.

The permanent magnets are held in a slide-in frame. A slide-in frame is a frame that is open on one side in such a way that the magnets can be inserted therein one after the other. The height of the slide-in drawer into which the magnets are inserted is preferably smaller than the diagonal of the magnets located in a plane arranged in the slide-in direction. This way, it is avoided that the magnets can become distorted relative to each other during the slide-in action.

Correspondingly, it is possible to insert even magnets that are arranged in a Halbach configuration into the slide-in frame without the magnets becoming distorted relative to each other causing the direction of the magnetization relative to each other to change.

In contrast to known gluing methods, this allows for a considerably simplified installation. In addition, a simple assembly especially in Halbach configuration becomes possible, a configuration that is only very difficult to achieve with gluing. Based on the flow enhancement with the used Halbach configuration, it is possible to provide a magnetic actor of greater force.

Preferably, each lateral part comprises at least three, especially preferred are at least five, permanent magnets that are arranged in a Halbach configuration.

In an improvement of the invention each lateral part comprises at least two rows of magnets in a Halbach configuration arranged adjacent to each other.

The slide-in frame has preferably a bar that is arranged between the rows to provide the construct with added stiffness.

In an improvement of the invention the lateral parts are connected at two sides opposite to each other with a plate respectively. Contrary to the magnetic actors that are designed in a U-shape, this way the lateral parts are aligned relative to each other with higher accuracy and there is especially no bending action due to the magnetic forces.

In another improvement of the invention the lateral parts comprise an immobilization plate that is connected with the slide-in frame.

Preferably, the immobilization plate comprises clamping means, in particular screws for clamping the permanent magnets in place. The slide-in frame can also comprise clamping means such as, for example, screws for clamping the permanent magnets in place.

This way, after the magnets have been inserted, it is possible to achieve an exact alignment of the magnets relative to each other by the use of these clamping means.

The use of a relatively thinly configured slide-in frame is therefore possible. It is important, in particular, in this context that the slide-in frame is configured as thinly as possible on the side that is opposite of the coil so that the magnets are located in the closest possible proximity relative to the coil as possible. In particular, the wall strength of the slide-in frame on the side that borders the coil is less than 1 mm, preferably less than 0.5 mm and most preferably less than 0.3 mm.

This thin design of the frame, which is manufactured, for example, as a milled part made of stainless steel or aluminum, results necessarily in a low level of stability. Therefore, normally the frame by and of itself is not configured to be able to maintain the permanent magnets exactly in position relative to each other.

Rather, the purpose of the frame is to achieve a rough alignment of the magnets, in particular to ensure that the magnets do not become distorted relative to each other while they are being inserted in the slide-in frame. The exact alignment is preferably achieved by the clamping means that can be used to exactly align the magnet at least from two sides.

In an improvement of the invention at least the slide-in frame comprises fitting means such as, in particular, bore holes for an alignment pin, for the purposes of the exact positioning of the latter. In particular, it is envisioned that the lateral parts are exactly aligned by alignment pins relative to the plate that holds the two lateral parts together so that the space between the two lateral parts in which the coil is disposed can be kept as small as possible. In particular, it is envisioned that the coil housing has a maximum play of less than 2 mm between the lateral parts.

By positioning the coil and the permanent magnets as closely relative to each other as possible it is possible to achieve higher forces.

The magnetic actor is used, in particular, for a vibration isolation system that is used for the vibration-isolated support of a lithography or wafer inspection device.

The vibration isolation system comprises at least one bearing, in particular as fluid bearing, which acts at least in vertical and/or horizontal direction. In addition, the vibration isolation system comprises a previously described magnetic actor that can be triggered for the active vibration isolation.

Particularly envisioned is the use of a horizontally and vertically effective air bearing. Several magnetic actors, in particular three magnetic actors, are normally used for the active vibration isolation in all three directions in space.

Preferably, the coil is fastened on a vibration-isolated side of the vibration isolation system. This has the advantage that the component with the lower weight of the magnetic actor is fastened on the side that is to be isolated. But it is disadvantageous on this arrangement that, due to the necessary cable for triggering the coil, extra stiffness is added to the side that is to be isolated. However, on the other hand, it is advantageous that, when using the magnetic actors according to the invention, it is normally possible to forego fluid cooling for the coil. The stiffness of an electrical feed line can normally be substantially less than the stiffness of fluid lines for cooling purposes. Naturally, it is understood that a reverse arrangement is conceivable as well.

Furthermore, the invention relates to the installation of a magnetic actor, in particular of a magnetic actor as described previously and wherein a plurality of magnets are inserted, one after the other, in a Halbach configuration into a slide-in frame and then aligned relative to each other using clamping means.

The invention provides for a simple and quick installation of a magnetic actor utilizing magnets in a Halbach configuration.

BRIEF DESCRIPTION OF THE DRAWINGS

In the following, the invention will be described in more detail in reference to the drawings in FIG. 1 to FIG. 6 that show schematic depictions of an embodied example of the invention.

DETAILED DESCRIPTION

Figure 1:
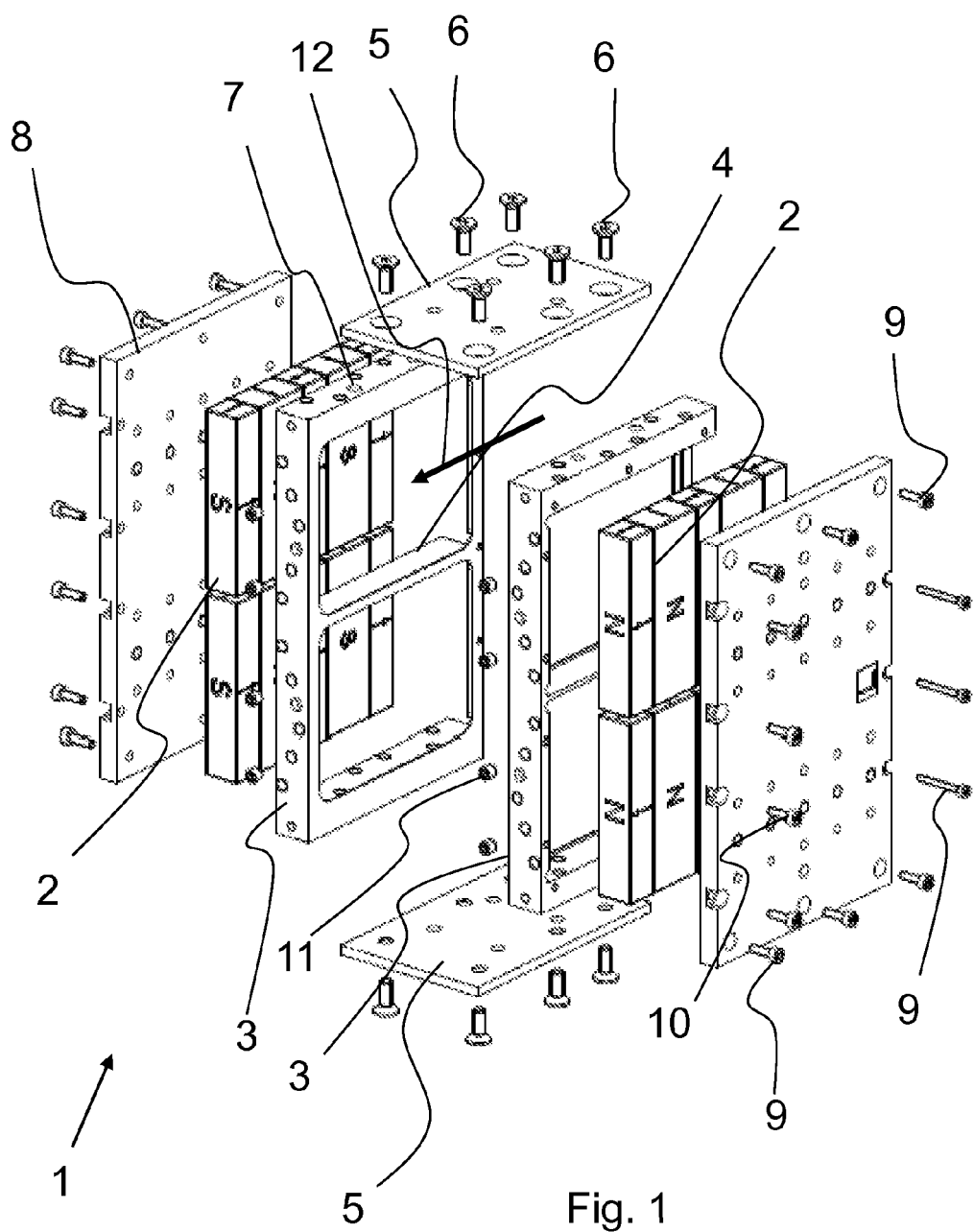
FIG. 1 shows a schematic exploded view of a magnetic actor.

FIG. 1 shows an exploded view of a magnetic actor 1, and wherein in this depiction the coil and the housing have been omitted.

The magnetic actor 1 comprises two lateral parts that consist of the slide-in frame 3, permanent magnets 2 and the immobilization plate 8 respectively.

The slide-in frame 3, which is, for example, milled of non-ferromagnetic stainless steel, serves for the insertion of the magnets 2 that are arranged in a Halbach configuration. The direction of the slide-in insertion is marked by the arrow 12. During the installation the permanent magnets 2 can be pushed, on after the other, into the slide-in frame 3. For this end, the slide-in frame is open only on the insertion side in such a manner as to allow for the possibility of sliding the magnets into the fame. The slide-in frame 3 prevents that the magnets 2, which are arranged in different magnetization directions respectively, become distorted relative to each other. Two rows of magnets are arranged in a Halbach configuration inside the slide-in frame respectively. The opposing lateral parts that result accordingly with the permanent magnets 2 are arranged in such a way that opposing magnets with a magnetization direction parallel relative to the insertion direction have a magnetization direction respectively in the opposite direction, while magnets that are arranged opposite each other have, with a magnetization direction perpendicular relative to the insertion direction, have the same magnetization direction.

A bar 4 is disposed in the middle of each slide-in frame 3 that primarily provides the slide-in frame 3 with stiffness but that also separates the two magnet rows from each other. The slide-in frames of the magnetic actor 1 are preferably comprised of non-ferromagnetic material.

The two slide-in frames 3 can be connected with each other by two plates 5. The screws 6 are driven in the bore holes of the slide-in frame 3 that are envisioned for this purpose. To achieve an exact positioning of the slide-in frame, said slide-in frame has at least one bore hole 7 into which an alignment pin can be fixed (not shown).

The immobilization plates 8 that can be fastened to the slide-in frame 3 by the screws 9 are used for the reinforcement of the magnetic flow and are comprised of a ferromagnetic material.

Moreover, the immobilization plates 8 comprise the screws 10 that serve as clamping means for the magnets 2. The slide-in frame 34 as well has screws 11, which are configured as worm screws, arranged perpendicular relative to the slide-in frame.

Using the screws 10 and 11, it is possible to exactly align the magnets 2 after they have been pushed into the slide-in frame 3.

By screws 10 it is achieved, in particular, that the magnets are disposed flush on the side of the slide-in frame 3 that is directed toward to the coil (not shown).

Figure 2:
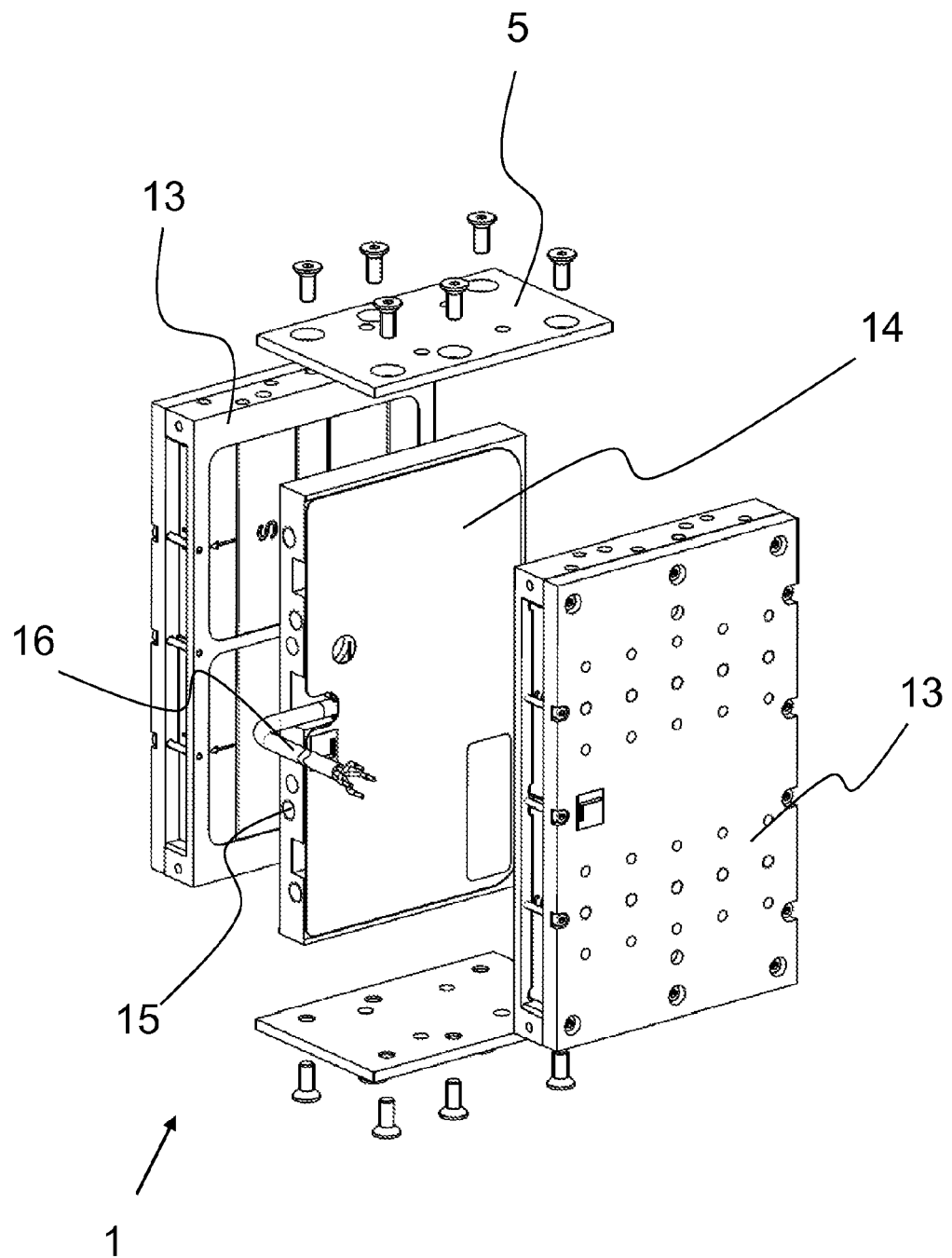
FIG. 2 shows a magnetic actor in a partially assembled state.

In the depiction in FIG. 2 the lateral parts 13, comprising immobilization plate, slide-in frame and magnets, are fully installed and only await being connected with the plates 5 to achieve a frame-shaped arrangement. Naturally, it is understood that this representation does not necessarily reflect the actual installation order. Preferably, it is envisioned that the slide-in frame is first connected with the plates 5 and the immobilization plates after which time the magnets are inserted.

A coil housing 14, which is also configured as substantially rectangular, is arranged between the lateral parts 13, and in which the coil is disposed (not shown). A connecting cable 16 is routed out of the coil housing that serves for the triggering of the coil. In addition, it is also possible to route a grounding cable out of the housing (not shown) for safety reasons if the coil is triggered with higher voltage.

Further, the coil housing 14 comprises fastening recesses 15 that can be used, for example, to fasten the housing to the part that is to be isolated or to the floor part of a vibration isolation system (not shown). The fastening recesses 15 are configured, for example, as a thread.

Figure 3:
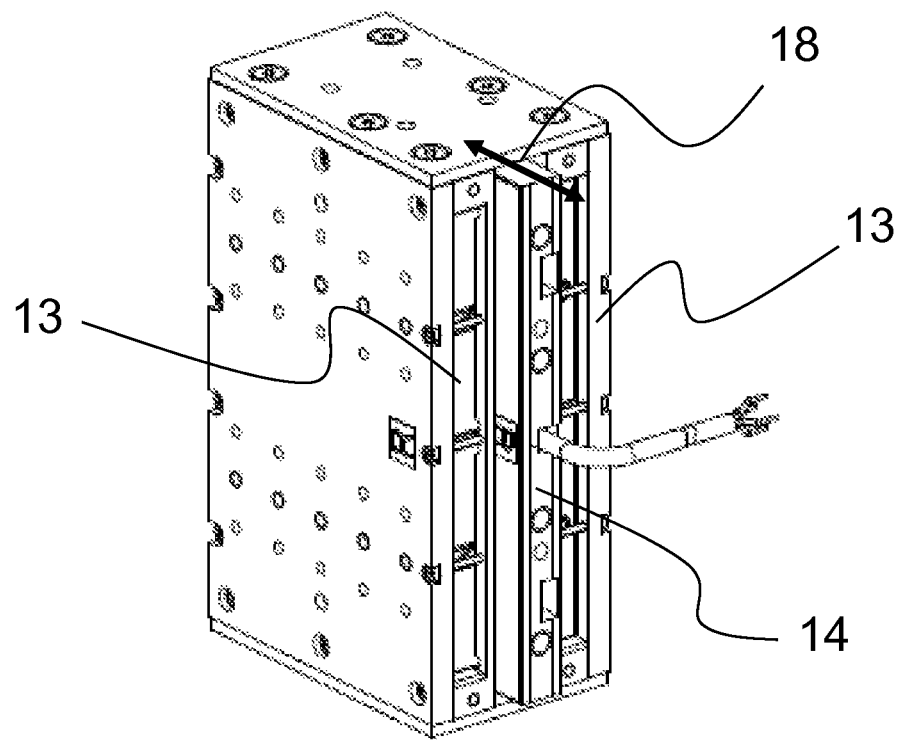
FIG. 3 shows the magnetic actor in the fully assembled state.

FIG. 3 shows the fully assembled magnetic actor 1. Visible are the two lateral parts 13 that are arranged opposite relative to each other with the coil hosing 14 between them.

By triggering the coil in the coil housing 14 it is possible to generate a force that is substantially parallel relative to the plane of the coil. The direction of this force is shown by arrow 18.

In order to achieve a force that is as high as possible, it is important that the magnets and the coil are disposed as closely relative to each other as possible; this means, the play of the coil housing inside the gap between the slide-in frame 13 and the distance to the magnets should be as small as possible.

Figure 4:
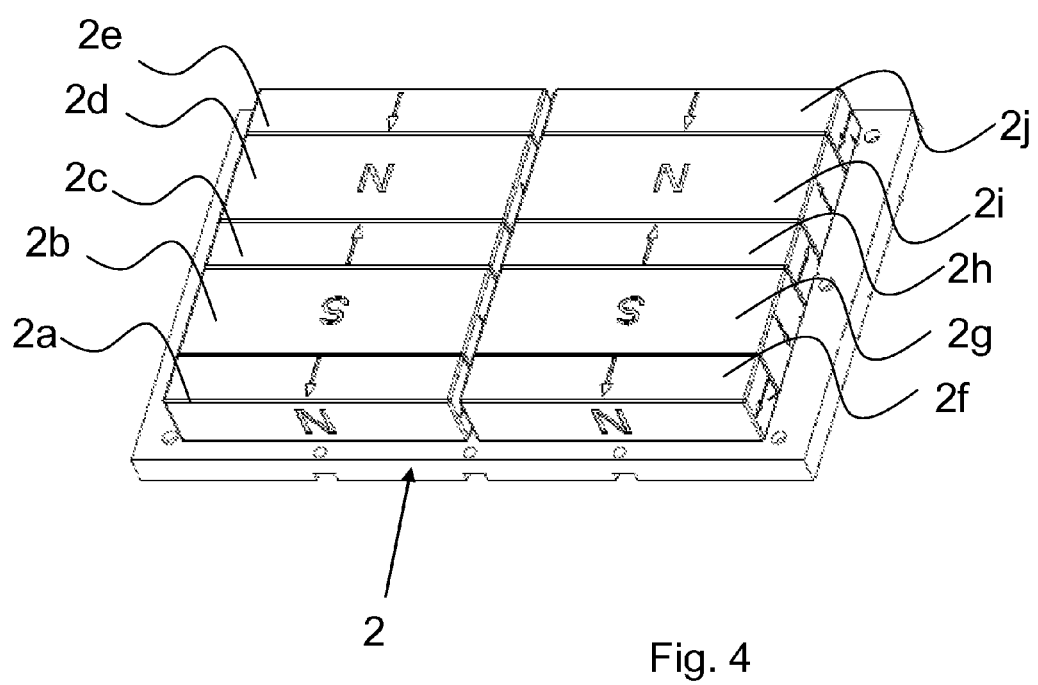
FIG. 4 shows the arrangement of the permanent magnets of the magnetic actor.

FIG. 4 is a detail image of the permanent magnets 2. The Permanent magnets 2 are arranged in two rows of five magnets respectively.

The magnets 2a to 2e therein constitute the array that is arranged in a Halbach configuration, the magnet 2f to 2j the other. Each row thus comprises five magnets that are disposed in a Halbach configuration.

In an alternative embodied example, it is possible, for example, to omit the magnets 2a, 2e, 2f and 2j with the result that each row only comprises three magnets in a Halbach configuration. The North poles of the magnets are marked by an N, the South poles by an S, and the corresponding direction of magnetization is indicated by an arrow. A magnetic actor according to this class requires the use of very strong permanent magnets that tend to become distorted relative to each other because of the different directions of magnetization.

Figure 5:
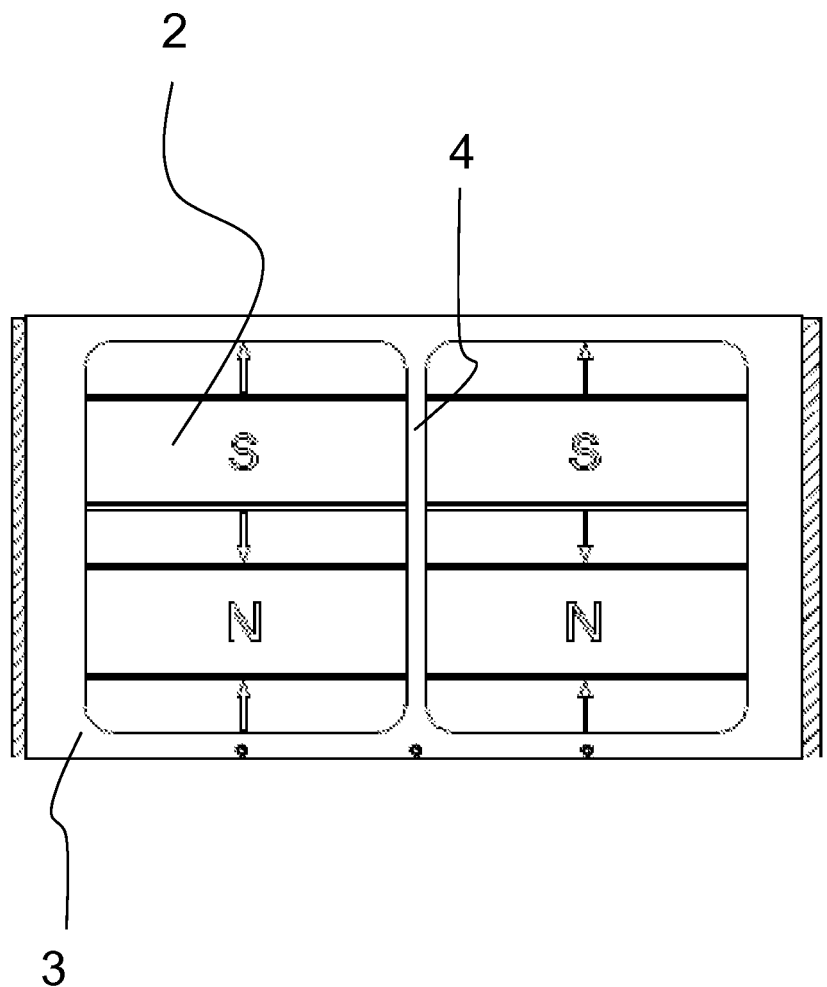
FIG. 5 shows the permanent magnets placed inside the slide-in frame of the magnetic actor.

FIG. 5 represents a slide-in frame 3 with the fully inserted magnets 2. In this depiction, the side of the slide-in frame is visible that comes to lie opposite the coil in the assembled state. Also visible is the bar 4 that is arranged along the center line of the slide-in frame. The side of the slide-in frame 3 that is depicted in the present view should be configured as thinly as possible so that the magnets 2 are located in the closest possible proximity next to the coil.

Figure 6:
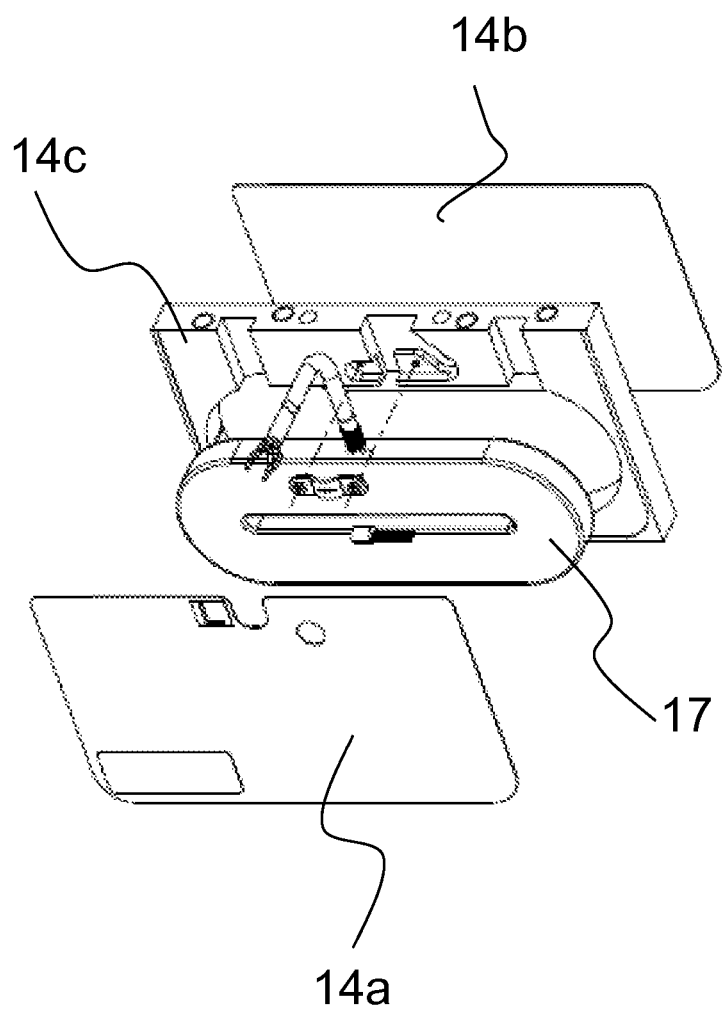
FIG. 6 shows an exploded view of a coil with the associated housing.

FIG. 6 is a schematic view of the housing of the coil comprising lateral parts 14a, 14b and center part 14c.

The center part 14c has a recess suited to receive the coil 17, which can comprise, for example, at least 1000 windings (not shown). The plane of the coil is located substantially parallel relative to lateral parts 14a, 14b.

With the present invention it was possible to provide a magnetic actor that allows for generating forces well above 100 N. Due to the slide-in frame it is possible to provide for especially easy installation of the magnets, which are arranged in a Halbach configuration.

Naturally, it is understood that the invention is not limited to a combination of these previously described characteristics and that the person skilled in the art can utilize the described characteristics in any combination that is technically suitable.

LIST OF THE REFERENCE SYMBOLS

1 Magnetic actor
2 Magnets
3 Slide-in frame
4 Bar
5 Plate
5 Screw
6 Bore hole
8 Immobilization plate
9 Screw
10 Screw
11 Screw
12 Arrow
13 Lateral part
14 Coil housing
14a Lateral part
14b Lateral part
14c Center part
15 Fastening recess
16 Connecting cable
17 Coil
18 Arrow

What is claimed is:

1. A magnetic actor comprising:
   two lateral parts that are arranged opposite each other with permanent magnets, wherein each lateral part comprises at least two permanent magnets in a Halbach configuration; and
   a coil that is arranged between the two lateral parts in such a way that the coil is movable relative to the two lateral parts, wherein a force is generated between the two lateral parts when the coil is triggered, and wherein the permanent magnets are held inside a slide-in frame that is open only on one side for insertion of a magnet and that avoids the magnets becoming distorted during a slide-in action; and
   wherein the insertion height of the slide-in frame is smaller than the diagonal of the permanent magnets in a plane that extends in the direction of the insertion.

2. The magnetic actor as claimed in claim 1 wherein each of the two lateral parts comprises at least three permanent magnets that are disposed in a Halbach configuration.

3. The magnetic actor as claimed in claim 1 wherein each of the two lateral parts comprises at least two rows of magnets that are disposed in a Halbach configuration adjacent to each other.

4. The magnetic actor as claimed in claim 3 wherein the slide-in frame comprises a bar that is disposed between the rows.

5. The magnetic actor as claimed in claim 1 wherein the two lateral parts are connected with a plate respectively at two sides that are opposite each other.

6. The magnetic actor as claimed in claim 1 wherein the lateral parts comprise an immobilization plate that is connected with the slide-in frame.

7. The magnetic actor as claimed in claim 6 wherein the immobilization plate comprises clamping means for clamping the permanent magnets in place.

8. The magnetic actor as claimed in claim 6 wherein the immobilization plate comprises screws for clamping the permanent magnets in place.

9. The magnetic actor as claimed in claim 1 wherein the slide-in frame comprises clamping means for clamping the permanent magnets in place.

10. The magnetic actor as claimed in claim 1 wherein the slide-in frame comprises adjusting means for positioning the slide-in frame.

11. A vibration isolation system for vibration-isolated support of a lithography or wafer inspection device, comprising:
    at least one bearing that is effective at least in a vertical and/or horizontal direction; and
    a magnetic actor as claimed in claim 1 that can be triggered for active vibration isolation.

12. The vibration isolation system as claimed in claim 11 characterized in that the coil is fastened on a vibration-isolated side of the vibration isolation system.

13. The magnetic actor as claimed in claim 1 wherein each of the two lateral parts comprises five permanent magnets that are disposed in a Halbach configuration.

14. The magnetic actor as claimed in claim 1 wherein the slide-in frame comprises screws for clamping the permanent magnets in place.

15. The magnetic actor as claimed in claim 1 wherein the slide-in frame comprises bore holes for an adjustment pin, for positioning the slide-in frame.

* * * * *